United States Patent
Ozawa

(10) Patent No.: US 10,007,450 B2
(45) Date of Patent: Jun. 26, 2018

(54) STORAGE CONTROLLER, METHOD, AND STORAGE SYSTEM

(71) Applicant: Fujitsu Limited, Kawasaki-shi, Kanagawa (JP)

(72) Inventor: Toshihiro Ozawa, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 312 days.

(21) Appl. No.: 15/057,647

(22) Filed: Mar. 1, 2016

(65) Prior Publication Data
US 2016/0259581 A1 Sep. 8, 2016

(30) Foreign Application Priority Data
Mar. 2, 2015 (JP) .................... 2015-040374

(51) Int. Cl.
*G06F 12/00* (2006.01)
*G06F 3/06* (2006.01)

(52) U.S. Cl.
CPC ............ *G06F 3/0619* (2013.01); *G06F 3/065* (2013.01); *G06F 3/067* (2013.01)

(58) Field of Classification Search
CPC ......... G06F 3/0619; G06F 3/065; G06F 3/067
See application file for complete search history.

(56) References Cited

U.S. PATENT DOCUMENTS

| 8,793,531 B2* | 7/2014 | George | G06F 17/30519 |
| | | | 714/11 |
| 9,639,387 B2* | 5/2017 | Obata | G06F 9/45558 |
| 9,671,960 B2* | 6/2017 | Patel | G06F 3/0608 |

FOREIGN PATENT DOCUMENTS

| JP | 06-332782 | 12/1994 |
| JP | 2010-074604 | 4/2010 |
| WO | 2012/164735 | 12/2012 |

* cited by examiner

*Primary Examiner* — Matthew Bradley
(74) *Attorney, Agent, or Firm* — Oblon, McClelland, Maier & Neustadt, L.L.P.

(57) ABSTRACT

A storage controller is coupled to a plurality of storage devices, the storage controller is configured to receive a first write request of data, determine a first time when the first write request is received, specify, based on the first time, a first storage device included in the plurality of storage devices, write the data into the first storage device, receive a read request for the data, determine a second time when the read request is received, specify a second storage device included in the plurality of storage devices, wherein, in anticipation of a second write request received at the second time, the processor specifies the second storage device based on the second time, determine whether the first storage device is identical to the second storage device, and not read the data from the first storage device when the first storage device is identical to the second storage device.

18 Claims, 10 Drawing Sheets

FIG. 7

| | RANGE | 1st REPLICA | 2nd REPLICA | 3rd REPLICA |
|---|---|---|---|---|
| 701 | 0 – 99 | SERVER S11 | SERVER S21 | SERVER S31 |
| 702 | 100 – 199 | SERVER S41 | SERVER S11 | SERVER S51 |
| 703 | 200 – 299 | SERVER S21 | SERVER S41 | SERVER S11 |

700

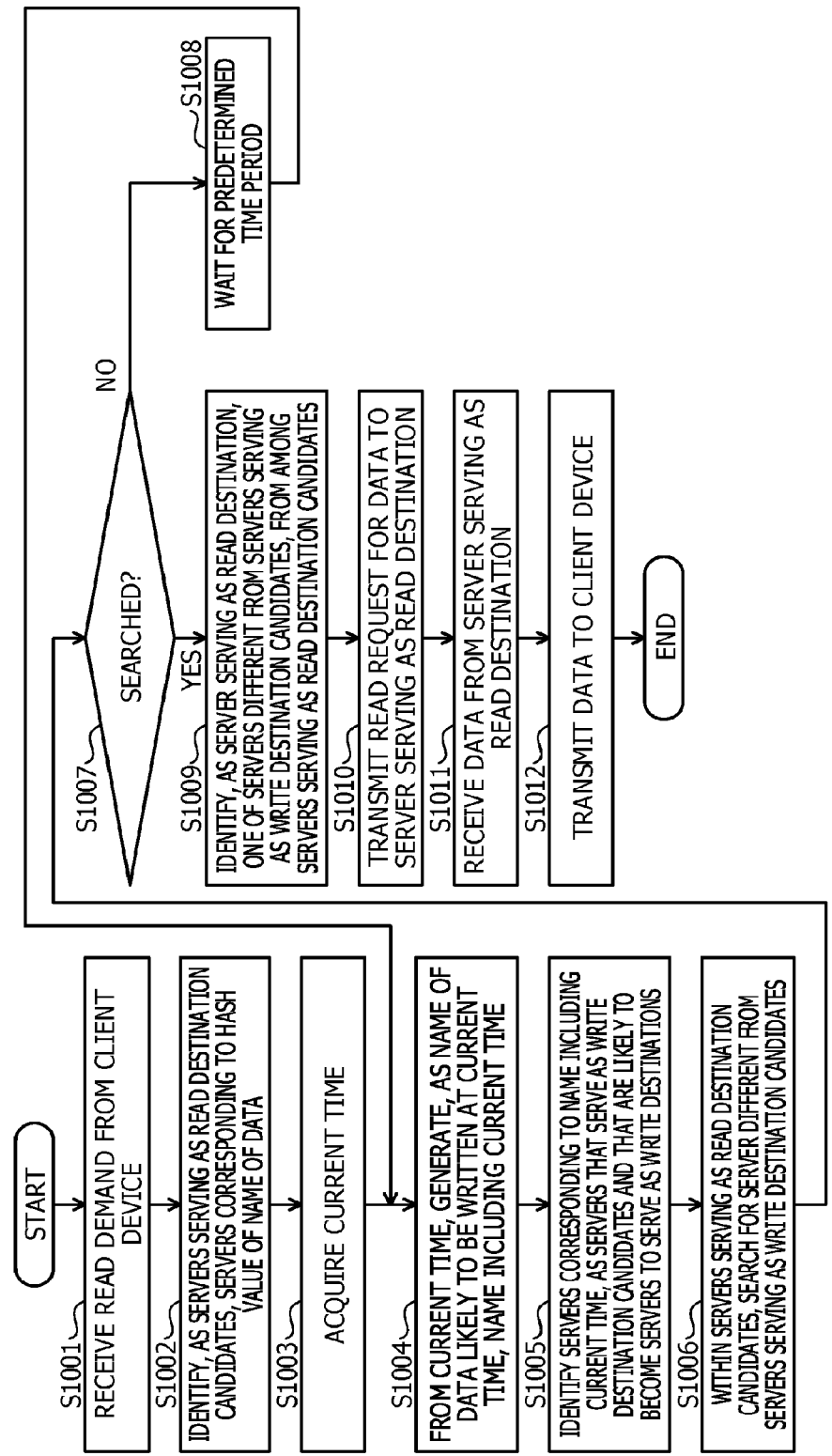

STORAGE CONTROLLER, METHOD, AND STORAGE SYSTEM

CROSS-REFERENCE TO RELATED APPLICATION

This application is based upon and claims the benefit of priority of the prior Japanese Patent Application No. 2015-040374, filed on Mar. 2, 2015, the entire contents of which are incorporated herein by reference.

FIELD

The embodiments discussed herein are related to a storage controller, a method and a storage system.

BACKGROUND

In the past, a distributed storage in which data is stored by using servers has been known. In addition, in the distributed storage, there is known a technology in which data is duplicated and stored in servers, thereby avoiding a loss of data caused by a failure of a server. As a related technology, there is known a technology in which, from, for example, a list of coordinates of data processing devices serving as candidates for read destinations or write destinations of distributed data, a data processing device to serve as a read destination or a write destination is determined based on distances between coordinates of the candidates and a device itself. In addition, there is known a technology in which a set of, for example, keys is divided into segments, thereby managing, in units of segments, pieces of data memorized while being associated with the keys. In addition, there is known a technology in which files are managed by using, for example, a load information table for measuring and managing a load status of each of file servers and a file attribute table for recording and managing a file server in charge of access to each of file blocks.

As examples of the related art, Japanese Laid-open Patent Publication No. 6-332782, International Publication Pamphlet No. WO 2012/164735, and Japanese Laid-open Patent Publication No. 2010-74604 are known.

SUMMARY

According to an aspect of the invention, a storage controller is configured to be coupled to a plurality of storage devices, the storage controller includes a memory, and a processor coupled to the memory and configured to receive a first write request of data, determine a first time when the first write request is received, specify, based on the first time, a first storage device included in the plurality of storage devices, write the data into the first storage device, receive a read request for the data, determine a second time when the read request is received, specify a second storage device included in the plurality of storage devices, wherein, in anticipation of a second write request received at the second time, the processor specifies the second storage device based on the second time, determine whether the first storage device is identical to the second storage device, and read the data from the first storage device when the first storage device is not identical to the second storage device, but not read the data from the first storage device when the first storage device is identical to the second storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 illustrates an example of a memory content of a write destination table 700;

FIG. 10 is a flowchart illustrating another example of the read processing procedure.

DESCRIPTION OF EMBODIMENTS

In the above-mentioned technologies of the related art, for a memory device included in one of servers in the distributed storage that duplicates and stores data in the servers, in some cases writing of data and reading of data compete with each other, thereby causing performance degradation of writing of data.

In one aspect, an object of the present embodiment is to provide a storage device, a read memory device determination method, and a storage system that are able to suppress performance degradation of writing of data into a memory device.

Hereinafter, embodiments of a storage device, a read memory device determination method, and a storage system according to the present embodiment will be described in detail with reference to drawings.

(Example of Read Memory Device Determination Method According to Embodiment)

Figure 1:
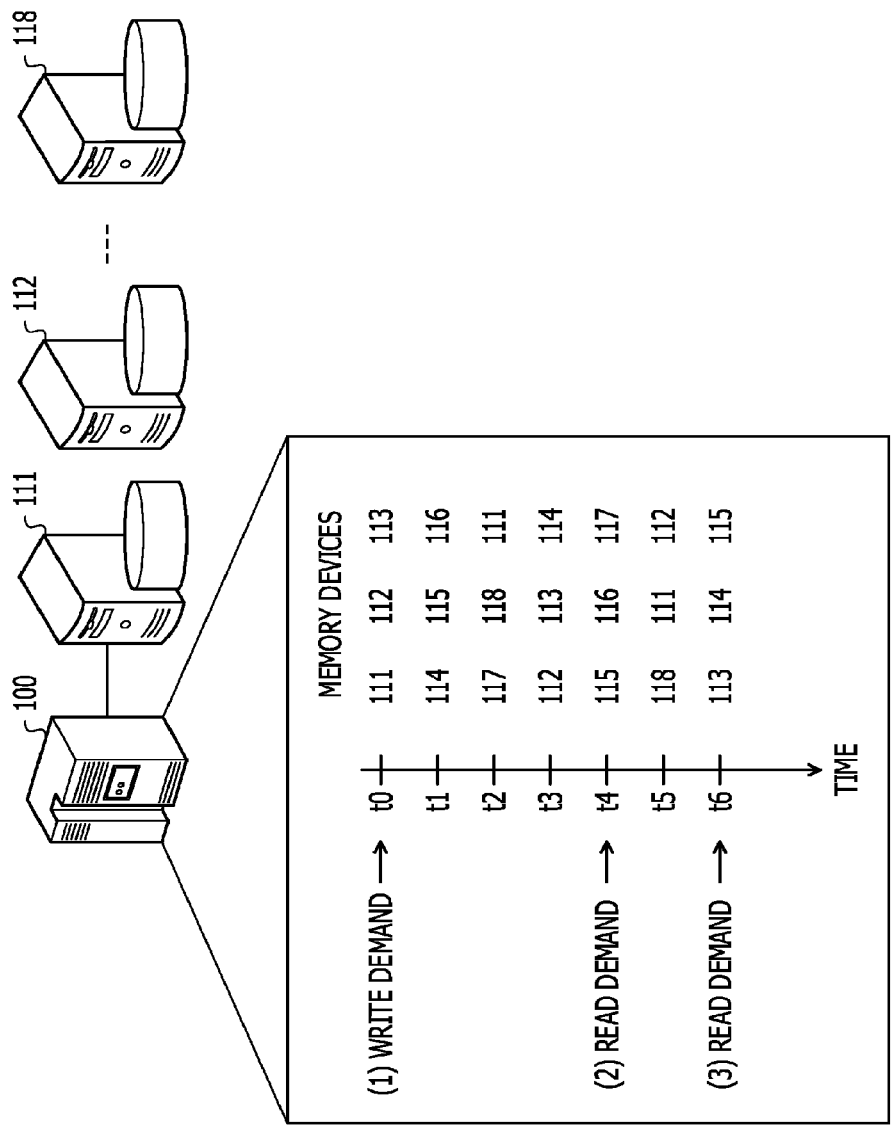
FIG. 1 illustrates an example of a read memory device determination method according to an embodiment.

FIG. 1 illustrates an example of a read memory device determination method according to an embodiment. A storage device 100 is a computer accessible to a memory device group. The storage device 100 identifies, from the memory device group, a memory device serving as a write destination, into which data is to be written, or a memory device serving as a read destination, from which data is to be read, and controls writing of data and reading of data.

Here, a case where an arithmetic device of the related art identifies memory devices serving as write destinations from a memory device group in accordance with a name of data and writes data into each of the identified memory devices is thought. However, in this case, in some cases, the arithmetic device identifies a memory device into which a piece of data is likely to be written when another piece of data is read therefrom. As a result, in some cases, performance degradation of writing of data into the memory device is caused.

In addition, in a case where there are arithmetic devices of the related art, which each write data, when one of the arithmetic devices reads a piece of data, it is difficult to identify a memory device into which another arithmetic device of the related art is unlikely to write another piece of data. As a result, as a memory device serving as a read destination, from which data is to be read, one of the arithmetic devices turns out to identify a memory device serving as a write destination, into which another arithmetic device of the related art is to write data, and in some cases, performance degradation of writing of data into the memory device is caused. For example, in a case where the memory devices are magnetic disks, if reading of data is generated when data is sequentially written into a magnetic disk, it becomes difficult to sequentially access the magnetic disk, and performance degradation of writing of data is caused.

Therefore, in the present embodiment, a read memory device determination method in which performance degradation of writing of data into a memory device is suppressed will be described. According to, for example, the read memory device determination method, as a memory device serving as a read destination of a piece of data, a memory device different from a memory device into which another piece of data is likely to be written is specified, and performance degradation of writing of data into the memory device is suppressed.

The storage device 100 is able to identify a combination of memory devices in accordance with, for example, a time, and if a time changes, the storage device 100 changes the combination of memory devices. Here, in a case of receiving a write demand for data, the storage device 100 identifies, as memory devices to serve as write destinations of the data, memory devices corresponding to the time of the write demand. The time of the write demand is, for example, a time when the write demand is generated, a time when the write demand is transmitted, a time when the write demand is received, or the like. As the time of the write demand, the write demand may include, for example, the time when the write demand is generated, the time when the write demand is transmitted, or the like. In addition, the storage device 100 writes data into the identified memory devices serving as write destinations.

On the one hand, in a case of receiving a read demand for data, the storage device 100 identifies memory devices to serve as read destinations of the data, from among memory devices into which the data is written. From among, for example, the memory devices into which the data is written, the storage device 100 identifies, as the memory devices to serve as the read destinations of the data, memory devices different from memory devices corresponding to the time of the read demand. The memory devices corresponding to the time of the read demand are memory devices likely to become memory devices to serve as write destinations of another piece of data in a case where a write demand for the other piece of data is generated at the same time as that of the read demand. The time of the read demand is, for example, a time when the read demand is generated, a time when the read demand is transmitted, a time when the read demand is received, or the like. As the time of the read demand, the read demand may include, for example, the time when the read demand is generated, the time when the read demand is transmitted, or the like. In addition, the storage device 100 reads the data from the identified memory devices to serve as read destinations. From this, the storage device 100 is able to inhibit reading of data and writing of data from competing with each other in a memory device.

In the example of FIG. 1, in accordance with individual times, the storage device 100 identifies, as memory devices to serve as write destinations, respective combinations of memory devices, which are different from one another. At, for example, a time t0, the storage device 100 identifies memory devices 111, 112, and 113 as memory devices to serve as write destinations. In addition, at a time t1, the storage device 100 identifies memory devices 114, 115, and 116 as memory devices to serve as write destinations. In addition, at a time t2, the storage device 100 identifies memory devices 117, 118, and 111 as memory devices to serve as write destinations. Here, a case where the storage device 100 receives a write demand for data and a read demand for data will be described.

(1) It is assumed that the storage device 100 receives the write demand for data at the time t0. Upon receiving the write demand for data, the storage device 100 identifies, as memory devices to serve as write destinations of the data, the memory devices 111 to 113 corresponding to the time t0 of the write demand. In addition, the storage device 100 writes the data to each of the identified memory devices 111 to 113 serving as write destinations. From this, by writing the data into the memory devices, the storage device 100 is able to inhibit the data from being lost owing to a failure of a memory device.

The storage device 100 makes identifiable the memory devices into which the data is written. The storage device 100 memorizes the memory devices into which the data is written while associating the relevant memory devices with, for example, a name of the data. In addition, the storage device 100 may memorize the time of the write demand for the data while associating the time of the write demand for the data with the name of the data. In addition, in a case where the name of the data is a name including the time of the write demand for the data, the storage device 100 becomes able to identify the memory devices into which the data is written even if not memorizing the memory devices into which the data is written.

(2) It is assumed that the storage device 100 receives a read demand for data at a time t4. Upon receiving the read demand for data, from among the memory devices 111 to 113 into which data is written, the storage device 100 identifies, as memory devices to serve as read destinations of data, the memory devices 111 to 113 different from the memory devices 115 to 117 corresponding to the time t4. The memory devices 115 to 117 corresponding to the time t4 are memory devices likely to become memory devices to serve as write destinations of another piece of data at the time t4. If the memory devices 115 to 117 corresponding to the time t4 are defined as memory devices to serve as read destinations, reading of data and writing of data are likely to compete with each other. The storage device 100 reads the data from one of the identified memory devices 111 to 113 serving as read destinations.

(3) It is assumed that the storage device 100 receives a read demand for data at a time t6. Upon receiving the read demand for data, from among the memory devices 111 to 113 into which data is written, the storage device 100 identifies, as memory devices to serve as read destinations of data, the memory devices 111 and 112 different from the memory devices 113 to 115 corresponding to the time t6. The memory devices corresponding to the time t6 are memory devices likely to become memory devices to serve as write destinations of another piece of data at the time t6. If the memory devices corresponding to the time t6 are defined as memory devices to serve as read destinations, reading of data and writing of data are likely to compete with each other. The storage device 100 reads the data from one of the identified memory devices 111 and 112 serving as read destinations.

From this, in the storage device 100, as memory devices to serve as read destinations of a piece of data, memory devices different from memory devices likely to become write destinations of another piece of data are determined, and it is possible to inhibit reading of data and writing of data from competing with each other in a memory device. As a result, in the storage device 100, performance degradation of writing of data into a memory device is suppressed, and an increase in a time taken to write data is suppressed.

(Example of Storage System 200 According to Embodiment)

Next, using FIG. 2, an example of a storage system 200 according to an embodiment, into which the read memory device determination method illustrated in FIG. 1 is applied, will be described.

Figure 2:
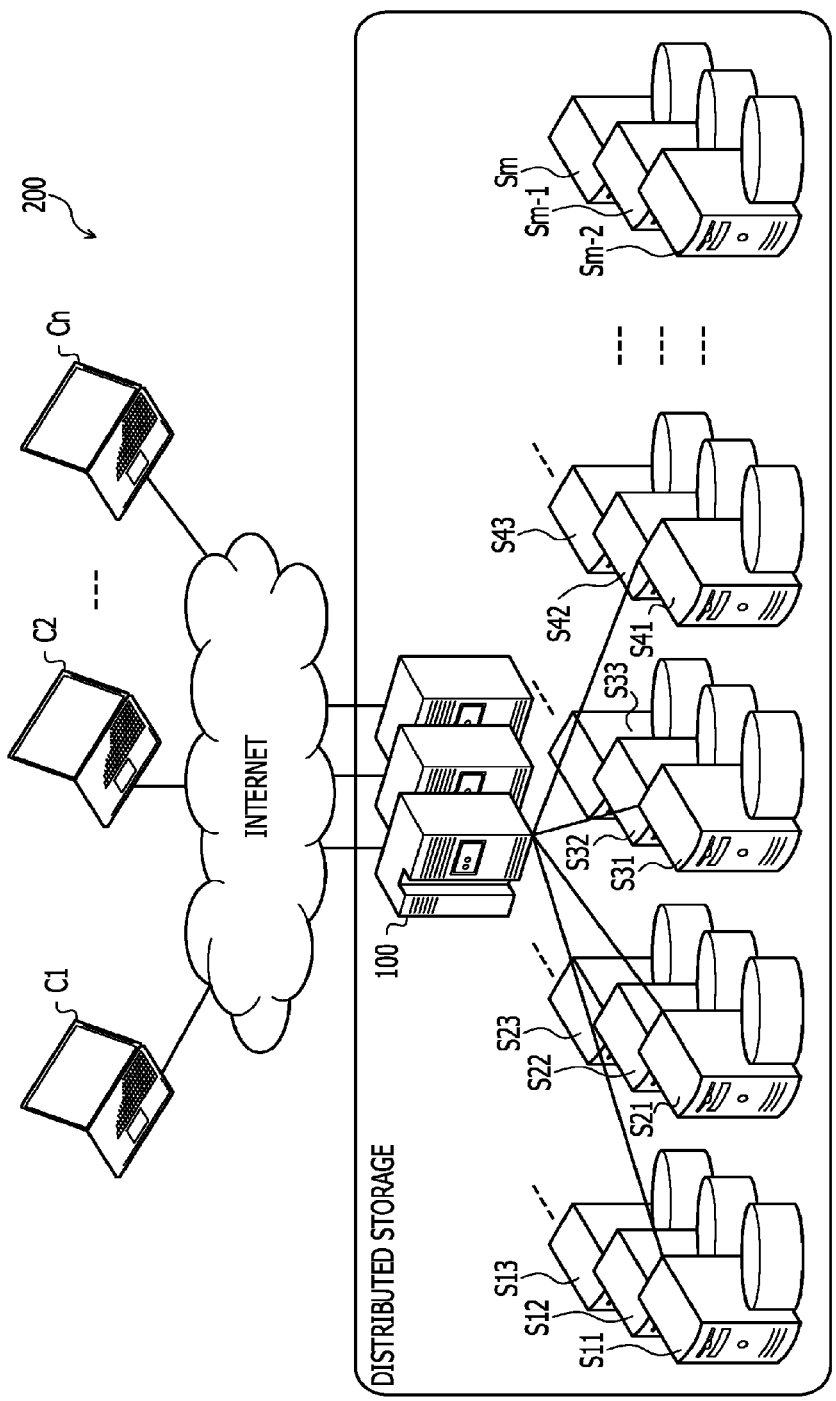
FIG. 2 illustrates an example of a storage system 200 according to an embodiment.

FIG. 2 illustrates an example of the storage system 200 according to an embodiment. In FIG. 2, the storage system 200 includes the storage devices 100, client devices C1, C2, . . . , Cn, and servers S11 to Sm. "n" is a natural number. In addition, "m" is a natural number.

In the following description, an arbitrary client device out of the client devices C1 to Cn is expressed as a "client device C" in some cases. In addition, in the following description, an arbitrary server out of the servers S11 to Sm is expressed as a "server S" in some cases.

One of the storage devices 100 receives, from one of the client devices C, a write demand for data or a read demand for data. Upon receiving the write demand for data, the corresponding storage device 100 identifies one of the servers S, as the server S including a memory device to serve as a write destination of data. In addition, the corresponding storage device 100 transmits a write request for data to the server S including the memory device to serve as the write destination and causes the server S to write the data into the memory device serving as the write destination. In the following description, the server S including the memory device serving as the write destination is expressed as the "server S serving as a write destination" in some cases.

On the one hand, upon receiving a read demand for data, one of the storage devices 100 identifies one of the servers S as the server S including a memory device to serve as a read destination of data. Next, the corresponding storage device 100 transmits a read request for data to the server S including the memory device to serve as the read destination and causes the corresponding server S to read the data from the memory device to serve as the read destination. In addition, the corresponding storage device 100 receives, from the corresponding server S, data read by the corresponding server S. In the following description, the server S including the memory device serving as the read destination is expressed as the "server S serving as a read destination" in some cases.

The client devices C are computers that each transmits, to the corresponding storage device 100, a write demand for data or a read demand for data. In a case of transmitting the read demand for data to the corresponding storage device 100, each of the client devices C receives the data from the corresponding storage device 100.

The servers S are computers that each receives, from the corresponding storage device 100, a write request for data or a read request for data. In a case of receiving the write request for data from the corresponding storage device 100, each of the servers S writes the data into a memory device included in the relevant server S itself. In addition, in a case of receiving the read request for data from the corresponding storage device 100, each of the servers S reads the data from a memory device included in the relevant server S itself. In addition, each of the servers S transmits the read data to the corresponding storage device 100.

The storage system 200 in FIG. 2 is used as a system that stores a large amount of stream data such as, for example, sensor data or log data, generated over time. In FIG. 2, the number of the storage devices 100 may be "1". In addition, the storage devices 100 may be integrated with the client devices C or the servers S. The number of the client devices C may be "1".

(Example of Hardware of Storage Device 100)

Next, using FIG. 3, an example of hardware of each of the storage devices 100 included in the storage system 200 illustrated in FIG. 2 will be described.

Figure 3:
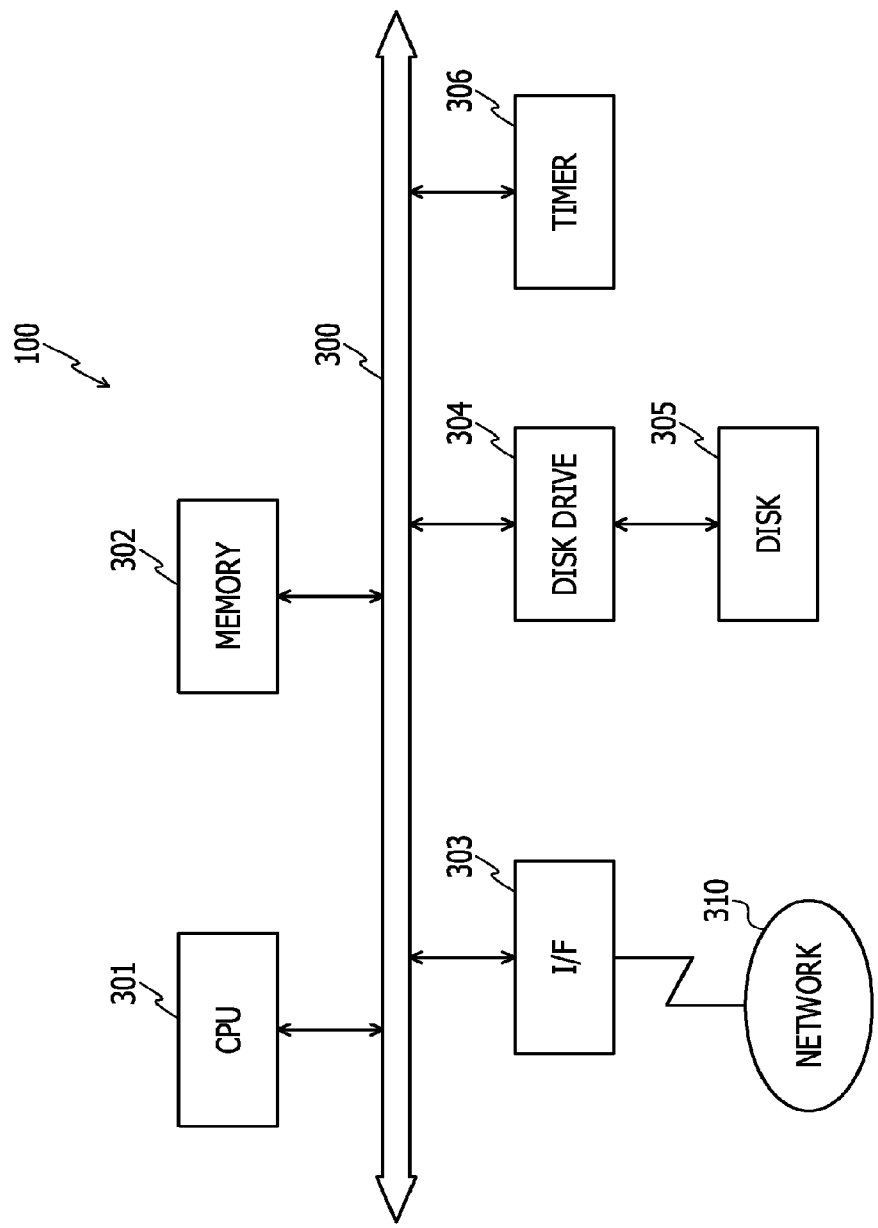
FIG. 3 illustrates an example of hardware of a storage device 100.

FIG. 3 illustrates an example of the hardware of each of the storage devices 100. In FIG. 3, the storage devices 100 each include a central processing unit (CPU) 301, a memory 302, an interface (I/F) 303, a disk drive 304, a disk 305, and a timer 306. In addition, the CPU 301, the memory 302, the I/F 303, the disk drive 304, and the timer 306 are coupled to one another by a bus 300.

Here, the CPU 301 controls the entire storage device 100. The memory 302 includes, for example, a read only memory (ROM), a random access memory (RAM), a flash ROM, and so forth. The flash ROM or the ROM memorizes, for example, various kinds of programs, and the RAM is used as the work area of the CPU 301. The programs memorized in the memory 302 are loaded into the CPU 301, thereby causing the CPU 301 to perform coded processing. In addition, the memory 302 memorizes various kinds of tables such as a write destination table 700 described later in FIG. 7 and a correspondence table 800 described later in FIG. 8.

The I/F 303 is coupled to a network 310 via a communication line and is coupled to other computers (for example, the client devices C illustrated in FIG. 2) via the network 310. In addition, the I/F 303 manages an interface between the network 310 and the inside and controls inputting and outputting of data from and to the other computers. The I/F 303 is, for example, a modem, a local area network (LAN) adapter, or the like.

In accordance with control by the CPU 301, the disk drive 304 controls reading and writing of data from and into the disk 305. The disk 305 memorizes data written based on control by the disk drive 304. The disk 305 is, for example, a magnetic disk, an optical disk, or the like. As substitute for the memory 302, the disk 305 may memorize therein various kinds of tables such as the write destination table 700 described later in FIG. 7 and the correspondence table 800 described later in FIG. 8. The timer 306 outputs a current time.

In addition to the above-mentioned configuration units, each of the storage devices 100 may include, for example, a solid state drive (SSD), a keyboard, a mouse, a display, and so forth. Each of the storage devices 100 is, for example, a personal computer (PC), a notebook PC, or the like.

(Example of Hardware of Client Device C)

Figure 4:
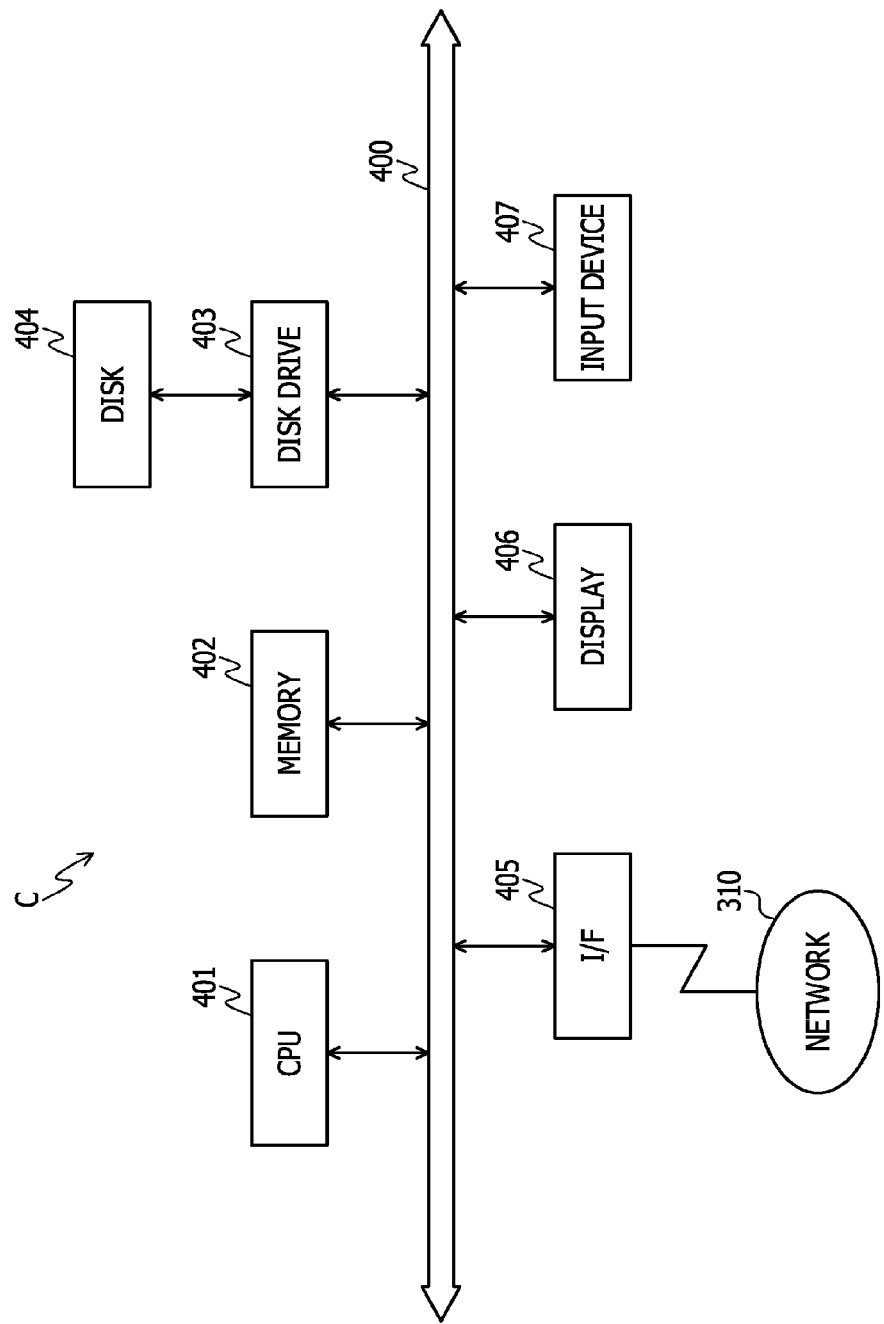
FIG. 4 illustrates an example of hardware of a client device C.

FIG. 4 illustrates an example of hardware of each of the client devices C. In FIG. 4, the client devices C each include a CPU 401, a memory 402, a disk drive 403, a disk 404, an I/F 405, a display 406, and an input device 407. In addition, the CPU 401, the memory 402, the disk drive 403, the I/F 405, the display 406, and the input device 407 are coupled to one another by a bus 400.

Here, the CPU 401 controls the entire client device C. The memory 402 includes, for example, a ROM, a RAM, a flash ROM, and so forth. The flash ROM or the ROM memorizes, for example, various kinds of programs, and the RAM is used as the work area of the CPU 401. The programs memorized in the memory 402 are loaded into the CPU 401, thereby causing the CPU 401 to perform coded processing.

In accordance with control by the CPU 401, the disk drive 403 controls reading and writing of data from and into the disk 404. The disk 404 memorizes data written based on control by the disk drive 403. As the disk 404, for example, a magnetic disk, an optical disk, or the like is cited.

The I/F 405 is coupled to the network 310 via a communication line and is coupled to other computers (for example, the storage devices 100 illustrated in FIG. 2) via the network 310. In addition, the I/F 405 manages an interface between the network 310 and the inside and controls inputting and outputting of data from and to the other computers.

The display 406 displays pieces of data such as documents, images, and function information, which include cursors, icons, or toolboxes. As the display 406, for example, a cathode ray tube (CRT), a liquid crystal display, an organic electroluminescence (EL) display, or the like may be adopted.

The input device 407 includes keys for inputting characters, numeric characters, various kinds of instructions, and so forth and inputs data. The input device 407 may be a keyboard, a mouse, or the like and may be a touch panel type input pad, a numerical keypad, or the like.

The client devices C may each omit, for example, the disk drive 403, the disk 404, or the like from among the above-mentioned configuration units. Then, in addition to the above-mentioned configuration units, the client devices C may each include, for example, an SSD, a scanner, a printer, and so forth. Each of the client devices C is, for example, a PC, a notebook PC, a mobile phone, a smartphone, a personal digital assistants (PDA), or the like.

(Example of Hardware of Server S)

Figure 5:
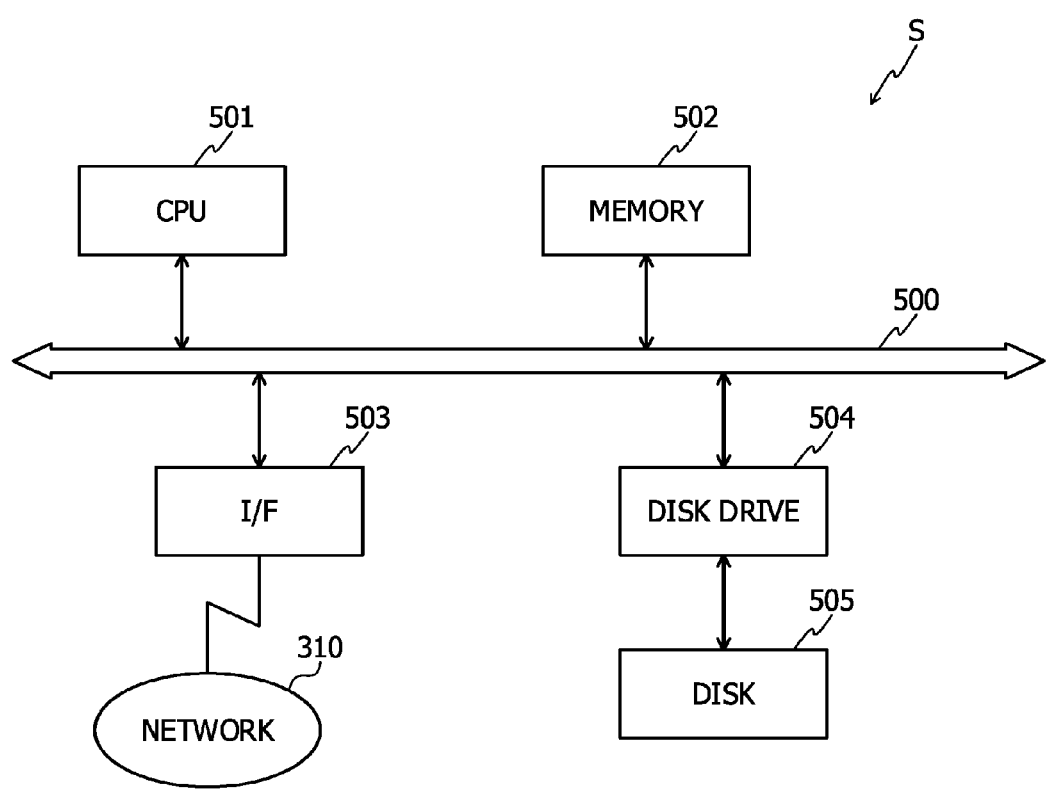
FIG. 5 illustrates an example of hardware of a server S.

FIG. 5 illustrates an example of hardware of each of the servers S. In FIG. 5, the servers S each include a CPU 501, a memory 502, an I/F 503, a disk drive 504, and a disk 505. In addition, the CPU 501, the memory 502, the I/F 503, and the disk drive 504 are coupled to one another by a bus 500.

Here, the CPU 501 controls the entire server S. The memory 502 includes, for example, a ROM, a RAM, a flash ROM, and so forth. The flash ROM or the ROM memorizes, for example, various kinds of programs, and the RAM is used as the work area of the CPU 501. The programs memorized in the memory 502 are loaded into the CPU 501, thereby causing the CPU 501 to perform coded processing.

The I/F 503 is coupled to the network 310 via a communication line and is coupled to other computers (for example, the client devices C illustrated in FIG. 2) via the network 310. In addition, the I/F 503 manages an interface between the network 310 and the inside and controls inputting and outputting of data from and to the other computers. The I/F 503 is, for example, a modem, a LAN adapter, or the like.

In accordance with control by the CPU 501, the disk drive 504 controls reading and writing of data from and into the disk 505. In accordance with control by the CPU 501 based on, for example, a write request for data or a read request for data from one of the storage devices 100, the disk drive 504 controls reading and writing of data from and into the disk 505. The disk 505 memorizes data written based on control by the disk drive 504. The disk 505 is, for example, a magnetic disk, an optical disk, or the like.

In addition to the above-mentioned configuration units, the servers S may each include, for example, an SSD, a keyboard, a mouse, a display, and so forth. Each of the servers S is, for example, a workstation, a PC, a notebook PC, or the like.

(Example of Functional Configuration of Storage Device 100)

Next, using FIG. 6, an example of a functional configuration of each of the storage devices 100 will be described.

Figure 6:
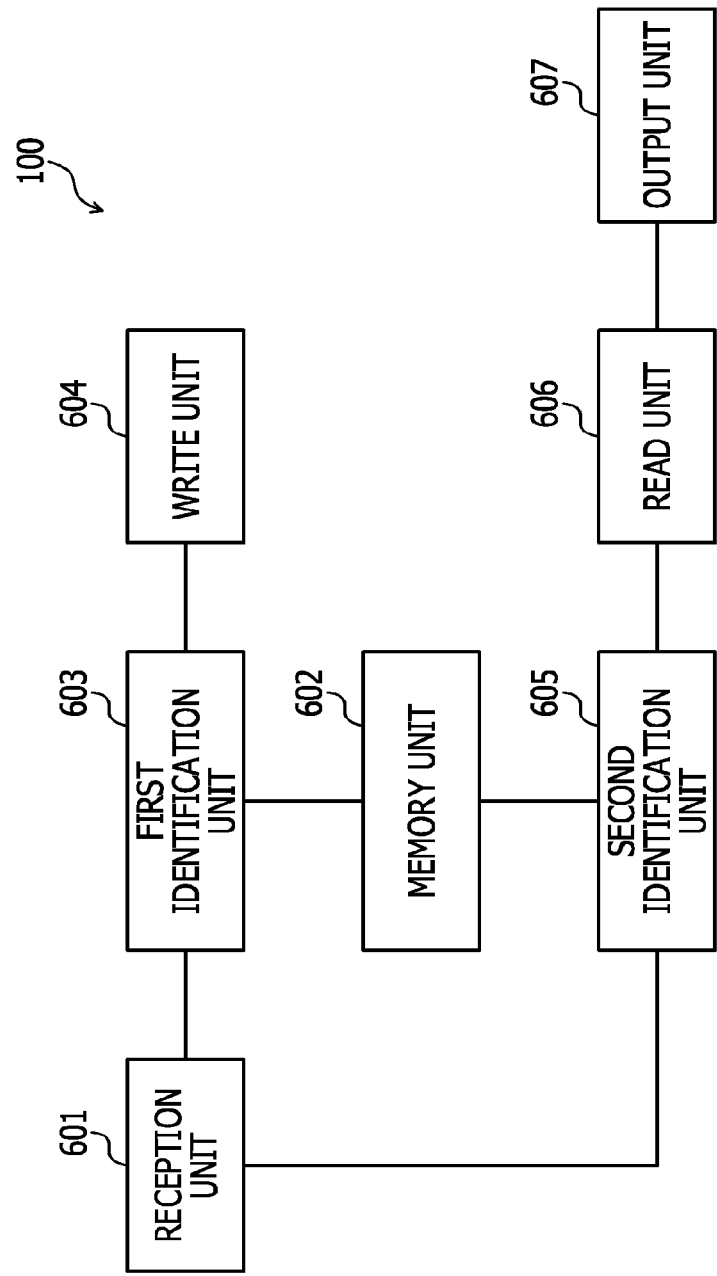
FIG. 6 illustrates an example of a functional configuration of the storage device 100.

FIG. 6 illustrates an example of the functional configuration of each of the storage devices 100. The storage devices 100 each include, as functions serving as control units, a reception unit 601, a memory unit 602, a first identification unit 603, a write unit 604, a second identification unit 605, a read unit 606, and an output unit 607. Using the control units, the storage devices 100 each perform, for example, a first write operation, a first read operation, a second write operation, or a second read operation.

The first write operation is an operation for performing, in accordance with a write demand for data, writing of the relevant data to which a name including the time of the write demand is assigned. The first read operation is an operation for performing, in accordance with a read demand for data to which a name including the time of a write demand is assigned, reading of the relevant data. The second write operation is an operation for performing, in accordance with a write demand for data, writing of the relevant data to which an arbitrary name is assigned. The second read operation is an operation for performing, in accordance with a read demand for data to which an arbitrary name is assigned, reading of the relevant data.

<First Write Operation>

First, the first write operation will be described. As described above, the first write operation is an operation for performing, in accordance with a write demand for data, writing of the relevant data to which a name including the time of the write demand is assigned. The first write operation is realized by, for example, the reception unit 601, the memory unit 602, the first identification unit 603, and the write unit 604.

The reception unit 601 receives a write demand for data. By receiving, from one of the client devices C, for example, a write demand for data, which includes data itself and the name of the data, the reception unit 601 receives the write demand for data. The name of the data is a character string including, for example, the time of the write demand for data. The name of the data is, for example, a character string in which values of respective units of the time of the write demand for data are arranged.

The time is expressed by, for example, units of years, months, days, hours, minutes, and seconds. The time may be expressed by units of hours, minutes, and seconds. Furthermore, the time may be expressed by a unit of microseconds. The time of the write demand is, for example, a time when the write demand is generated, a time when the write demand is transmitted, a time when the write demand is received, or the like. As the time of the write demand, the write demand may include, for example, the time when the write demand is generated, the time when the write demand is transmitted, or the like. From this, the reception unit 601 is able to receive data to be written into a memory device.

The received write demand is memorized in the storage area of, for example, the memory 302, the disk 305, or the like. By causing the CPU 301 to execute a program memorized in a memory device such as, for example, the memory 302 or the disk 305, illustrated in FIG. 3, or by using the I/F 303, the reception unit 601 realizes the function thereof.

For individual combinations of memory devices included in the memory device group, the memory unit 602 memorizes respective ranges of a hash value, different from one another. Each of the memory devices is a device that stores data for which a write demand is received by the reception unit 601. The memory devices are, for example, the disks 505 included in the servers S. The combinations of memory devices are combinations of memory devices whose numbers are equal to one another. In addition, the combinations of memory devices may be combinations of memory devices whose numbers are different from one another. The hash value is a value representing a piece of data. The hash value is calculated by substituting a piece of data into a hash function.

The memory unit 602 memorizes, for example, the write destination table 700 described later in FIG. 7. From this, the memory unit 602 is able to make identifiable a combination of memory devices corresponding to a hash value obtained from data for which a write demand is received. Using, for example, the memory 302 and the disk 305, illustrated in FIG. 3, the memory unit 602 realizes the function thereof.

In a case where the reception unit 601 receives a write demand for data, the first identification unit 603 identifies, from the memory device group, memory devices corresponding to the time of the write demand. In a case where the reception unit 601 receives, for example, a write demand for data to which a name including the time of the write demand is assigned, the first identification unit 603 identifies, from the memory device group, memory devices corresponding to the time included in the name. In a case where the reception unit 601 receives, for example, a write demand, the first identification unit 603 identifies memory devices within a combination corresponding to a hash value obtained from the time of the write demand.

In a case where the reception unit 601 receives, for example, a write demand, the first identification unit 603 substitutes a name including the time of the write demand into the hash function, thereby calculating a hash value. Next, the first identification unit 603 references the write destination table 700 memorized by the memory unit 602 and identifies, as memory devices to serve as write destinations of data, memory devices that correspond to the hash value and that are included in the servers S. From this, the first identification unit 603 is able to identify the memory devices to serve as the write destinations of data.

An identification result is memorized in, for example, the storage areas of the memory 302 and the disk 305. By causing the CPU 301 to execute programs memorized in, for example, the memory 302 and the disk 305, illustrated in FIG. 3, the first identification unit 603 realizes the function thereof.

The write unit 604 writes data into the memory devices identified by the first identification unit 603. The write unit 604 transmits a write request for data to, for example, the servers S including the memory devices that serve as write destinations and that are identified by the first identification unit 603. From this, the write unit 604 is able to write data into the memory devices serving as write destinations.

By causing the CPU 301 to execute programs memorized in, for example, the memory 302 and the disk 305, illustrated in FIG. 3, or by using the I/F 303, the write unit 604 realizes the function thereof.

<First Read Operation>

Next, the first read operation will be described. As described above, the first read operation is an operation for performing, in accordance with a read demand for data to which a name including the time of a write demand is assigned, reading of the relevant data. The first read operation is realized by, for example, the reception unit 601, the memory unit 602, the second identification unit 605, the read unit 606, and the output unit 607.

The reception unit 601 receives a read demand for data. By receiving, from one of the client devices C, for example, a read demand for data, which includes the name of the data, the reception unit 601 receives the read demand for data. The name of the data includes, for example, the time of a write demand for data. The name of the data is a character string of, for example, a time when the write demand for data is generated.

In the same way as in the first write operation, for individual combinations of memory devices included in the memory device group, the memory unit 602 memorizes respective ranges of a hash value, different from one another.

In a case where the reception unit 601 receives the read demand for data, the second identification unit 605 identifies, from among memory devices, memory devices different from memory devices corresponding to the time of the read demand. The time of the read demand is, for example, a time when the read demand is generated, a time when the read demand is transmitted, a time when the read demand is received, or the like. As the time of the read demand, the read demand may include, for example, the time when the read demand is generated, the time when the read demand is transmitted, or the like.

In a case where the reception unit 601 receives, for example, a read demand for data to which a name including the time of a write demand is assigned, the second identification unit 605 identifies, from among memory devices corresponding to the time included in the name, memory devices different from memory devices corresponding to the time of the read demand. In a case where the reception unit 601 receives, for example, a read demand, the second identification unit 605 identifies, from among memory devices, memory devices different from memory devices memorized while being associated with a hash value obtained from the time of the read demand.

In a case where the reception unit 601 receives, for example, a read demand, the second identification unit 605 substitutes a name including the time of a write demand into the hash function, thereby calculating a hash value. Next, the second identification unit 605 references the write destination table 700 memorized by the memory unit 602 and identifies, as a combination of memory devices serving as read destination candidates, a combination of memory devices that correspond to the hash value and that are included in the servers S. The memory devices serving as read destination candidates are memory devices into which data is written and that are likely to become memory devices to serve as read destinations of data. In addition, the second identification unit 605 substitutes a name including the time of the read demand into the hash function, thereby calculating a hash value.

Next, the second identification unit 605 identifies a combination of memory devices that serve as write destination candidates and that are likely to become memory devices to serve as write destinations, into which another piece of data is written at the time of the read demand. The memory devices serving as write destination candidates are memory devices likely to become memory devices to serve as write destinations of data. The second identification unit 605 references, for example, the write destination table 700 memorized by the memory unit 602 and identifies a combination of memory devices that correspond to the hash value and that are included in the servers S. In addition, from a combination of memory devices serving as read destination candidates, the second identification unit 605 identifies, as memory devices to serve as read destinations, memory devices different from memory devices serving as write destination candidates. From this, the second identification unit 605 is able to identify the memory devices to serve as the read destinations of data.

While here, from the combination of memory devices serving as read destination candidates, the second identification unit 605 identifies memory devices different from memory devices serving as write destination candidates, the second identification unit 605 is not limited to this. In a case of, for example, selecting one memory device serving as a read destination candidate, determining whether or not being a memory device serving as a write destination candidate, and determining as not being a memory device serving as a write destination candidate, the second identification unit 605 may identify the selected memory device serving as a read destination candidate as a memory device to serve as a read destination.

In addition, in a case where, among, for example, memory devices, there is no memory device different from memory devices corresponding to the time of a read demand, the second identification unit 605 may identify one of the memory devices. In a case where, within, for example, combinations of memory devices serving as read destination candidates, there is no memory device different from memory devices serving as write destination candidates, the second identification unit 605 identifies, as memory devices to serve as read destinations, one of combinations of memory devices serving as read destination candidates. From this, the second identification unit 605 is able to identify memory devices serving as read destination of data.

In addition, in a case where, among, for example, memory devices, there is no memory device different from memory devices corresponding to the time of the read demand, the second identification unit 605 may identify memory devices different from memory devices corresponding to a time a predetermined time period later than the time of the read demand. In a case where, within, for example, combinations of memory devices serving as read destination candidates, there is no memory device different from memory devices serving as write destination candidates, the second identification unit 605 substitutes, into the hash function, a name including a time the predetermined time period later than the time of the read demand, thereby calculating a hash value.

Next, the second identification unit 605 identifies a combination of memory devices that serve as write destination candidates and that are likely to become memory devices to serve as write destinations, into which another piece of data is written at a time the predetermined time period later than the time of the read demand. The second identification unit 605 references, for example, the write destination table 700 memorized by the memory unit 602 and identifies a combination of memory devices that correspond to the hash value and that are included in the servers S. In addition, from a combination of memory devices serving as read destination candidates, the second identification unit 605 identifies, as memory devices to serve as read destinations, memory devices different from memory devices serving as write destination candidates. From this, the second identification unit 605 is able to identify the memory devices to serve as the read destinations of data.

In addition, in a case where, among, for example, memory devices, there is no memory device different from memory devices corresponding to the time of the read demand, the second identification unit 605 may wait for a predetermined time period and identify memory devices different from memory devices corresponding to a time the predetermined time period later than the time of the read demand. In a case where, among, for example, memory devices, there is no memory device different from memory devices corresponding to the time of the read demand, the second identification unit 605 waits for the predetermined time period after the time of the read demand. In addition, the second identification unit 605 substitutes, into the hash function, a name including a time the predetermined time period later than the time of the read demand, thereby calculating a hash value.

Next, the second identification unit 605 identifies a combination of memory devices that serve as write destination candidates and that are likely to become memory devices to serve as write destinations, into which another piece of data is written at a time the predetermined time period later than the time of the read demand. The second identification unit 605 references, for example, the write destination table 700 memorized by the memory unit 602 and identifies a combination of memory devices that correspond to the hash value and that are included in the servers S. In addition, from a combination of memory devices serving as read destination candidates, the second identification unit 605 identifies, as memory devices to serve as read destinations, memory devices different from memory devices serving as write destination candidates. From this, the second identification unit 605 is able to identify the memory devices to serve as the read destinations of data.

An identification result is memorized in, for example, the storage areas of the memory 302 and the disk 305. By causing the CPU 301 to execute programs memorized in, for example, the memory 302 and the disk 305, illustrated in FIG. 3, the second identification unit 605 realizes the function thereof.

The read unit 606 reads data from the memory devices different from the memory devices that correspond to the time of the read demand and that are identified by the second identification unit 605. The read unit 606 transmits a read request for data to, for example, the servers S including the memory devices that serve as read destinations and that are identified by the second identification unit 605. From this, the read unit 606 is able to read data from the memory devices serving as read destinations.

In addition, from memory devices different from the memory devices that correspond to a time the predetermined time period later than the time of the read demand and that are identified by the second identification unit 605, the read unit 606 may read data at a time after the predetermined time period. The read unit 606 transmits a read request for data to, for example, the servers S including the memory devices that serve as read destinations and that are identified by the second identification unit 605. From this, the read unit 606 is able to read data from the memory devices serving as read destinations.

The read data is memorized in, for example, the storage areas of the memory 302 and the disk 305. By causing the CPU 301 to execute programs memorized in, for example, the memory 302 and the disk 305, illustrated in FIG. 3, or by using the I/F 303, the read unit 606 realizes the function thereof.

The output unit 607 transmits data, read by the read unit 606, to the client device C serving as a transmission source of the read demand for data. From this, the corresponding client device C is able to receive, from the corresponding storage device 100, the data subjected to the read demand.

By causing the CPU 301 to execute programs memorized in, for example, the memory 302 and the disk 305, illustrated in FIG. 3, or by using the I/F 303, the output unit 607 realizes the function thereof.

<Second Write Operation>

First, the second write operation will be described. As described above, the second write operation is an operation for performing, in accordance with a write demand for data, writing of the relevant data to which an arbitrary name is assigned. The second write operation is realized by, for example, the reception unit 601, the memory unit 602, the first identification unit 603, and the write unit 604.

The reception unit 601 receives a write demand for data. By receiving, from one of the client devices C, for example, a write demand for data, which includes data itself and the name of the data, the reception unit 601 receives the write demand for data. The name of the data is, for example, an arbitrary character string. From this, the reception unit 601 is able to receive data to be written into memory devices.

In the same way as in the first write operation, for individual combinations of memory devices included in the memory device group, the memory unit 602 memorizes respective ranges of a hash value, different from one another. In addition, the memory unit 602 memorizes the name of data and the time of the write demand, written by the first identification unit 603, while associating the name of data and the time of the write demand with each other. The memory unit 602 memorizes, for example, the correspondence table 800 described later in FIG. 8.

In a case where the reception unit 601 receives the write demand for data, the first identification unit 603 identifies, from the memory device group, memory devices corresponding to the time of the write demand. In a case where the reception unit 601 receives, for example, a write demand for data, the first identification unit 603 acquires, as the time of the write demand, a current time. In addition, the first identification unit 603 identifies, from the memory device group, memory devices corresponding to the current time.

In a case where the reception unit 601 receives, for example, a write demand, the first identification unit 603 acquires, as the time of the write demand, a current time by using the timer 306. Next, the first identification unit 603 identifies memory devices within a combination corresponding to a hash value obtained from the current time. The first identification unit 603 writes, into the memory unit 602, the name of data and the current time while associating the name of data and the current time with each other. From this, the first identification unit 603 is able to identify memory devices serving as write destinations.

In the same way as in the first write operation, the write unit 604 writes data into the memory devices identified by the first identification unit 603. From this, the write unit 604 is able to write data into the memory devices serving as write destinations.

<Second Read Operation>

Next, the second read operation will be described. As described above, the second read operation is an operation for performing, in accordance with a read demand for data to which an arbitrary name is assigned, reading of the relevant data. The second read operation is realized by, for example, the reception unit 601, the memory unit 602, the second identification unit 605, the read unit 606, and the output unit 607.

The reception unit 601 receives a read demand for data. By receiving, from one of the client devices C, for example, a read demand for data, which includes the name of the data, the reception unit 601 receives the read demand for data. The name of the data is, for example, an arbitrary character string.

In the same way as in the first write operation, for individual combinations of memory devices included in the memory device group, the memory unit 602 memorizes respective ranges of a hash value, different from one another. In addition, the memory unit 602 memorizes the name of data and the time of a write demand, written in the second write operation, while associating the name of data and the time of a write demand with each other. The memory unit 602 memorizes, for example, the correspondence table 800 described later in FIG. 8.

In a case where the reception unit 601 receives the read demand for data, the second identification unit 605 identifies, from among memory devices corresponding to the time of the write demand memorized while being associated with the name, memory devices different from memory devices corresponding to the time of the read demand.

In a case where the reception unit 601 receives, for example, a read demand for data to which an arbitrary name is assigned, the second identification unit 605 identifies, from among memory devices corresponding to a time memorized in the memory unit 602 while being associated with the arbitrary name, memory devices different from memory devices corresponding to the time of the read demand. In a case where the reception unit 601 receives, for example, a read demand, the second identification unit 605 identifies, from among memory devices corresponding to a time memorized in the memory unit 602 while being associated with an arbitrary name, memory devices different from memory devices memorized while being associated with a hash value of the time of the read demand.

In a case where the reception unit 601 receives, for example, a read demand, the second identification unit 605 references the correspondence table 800 and substitutes, into the hash function, a name including a time corresponding to an arbitrary name, thereby calculating a hash value. Next, the second identification unit 605 references the write destination table 700 memorized by the memory unit 602 and identifies, as a combination of memory devices serving as read destination candidates, a combination of memory devices that correspond to the hash value and that are included in the servers S. In addition, the second identification unit 605 substitutes a name including the time of the read demand into the hash function, thereby calculating a hash value.

Next, the second identification unit 605 identifies a combination of memory devices that serve as write destination candidates and that are likely to become memory devices to serve as write destinations, into which another piece of data is written at the time of the read demand. The second identification unit 605 references, for example, the write destination table 700 memorized by the memory unit 602 and identifies a combination of memory devices that correspond to the hash value and that are included in the servers S. In addition, from a combination of memory devices serving as read destination candidates, the second identification unit 605 identifies, as memory devices to serve as read destinations, memory devices different from memory devices serving as write destination candidates. From this, the second identification unit 605 is able to identify the memory devices to serve as the read destinations of data.

In addition, in a case where, among, for example, memory devices, there is no memory device different from memory devices corresponding to the time of the read demand, the second identification unit 605 may identify one of the memory devices. In a case where, within combinations of memory devices serving as read destination candidates, there is no memory device different from memory devices serving as write destination candidates, the second identification unit 605 identifies, as memory devices to serve as read destinations, one of combinations of memory devices serving as read destination candidates. From this, the second identification unit 605 is able to identify memory devices serving as read destination of data.

In addition, in a case where, among, for example, memory devices, there is no memory device different from memory devices corresponding to the time of the read demand, the second identification unit 605 may identify memory devices different from memory devices corresponding to a time a predetermined time period later than the time of the read demand. In a case where, within, for example, combinations of memory devices serving as read destination candidates, there is no memory device different from memory devices serving as write destination candidates, the second identification unit 605 substitutes, into the hash function, a name including a time the predetermined time period later than the time of the read demand, thereby calculating a hash value.

Next, the second identification unit 605 identifies a combination of memory devices that serve as write destination candidates and that are likely to become memory devices to serve as write destinations, into which another piece of data is written at a time the predetermined time period later than the time of the read demand. The second identification unit 605 references, for example, the write destination table 700 memorized by the memory unit 602 and identifies a combination of memory devices that correspond to the hash value and that are included in the servers S. In addition, from a combination of memory devices serving as read destination candidates, the second identification unit 605 identifies, as memory devices to serve as read destinations, memory devices different from memory devices serving as write destination candidates. From this, the second identification unit 605 is able to identify the memory devices to serve as the read destinations of data.

In addition, in a case where, among, for example, memory devices, there is no memory device different from memory devices corresponding to the time of the read demand, the second identification unit 605 may wait for a predetermined time period and identify memory devices different from memory devices corresponding to a time the predetermined time period later than the time of the read demand. In a case where, among, for example, memory devices, there is no memory device different from memory devices corresponding to the time of the read demand, the second identification unit 605 waits for the predetermined time period after the time of the read demand. In addition, the second identification unit 605 substitutes, into the hash function, a name including a time the predetermined time period later than the time of the read demand, thereby calculating a hash value.

Next, the second identification unit 605 identifies a combination of memory devices that serve as write destination candidates and that are likely to become memory devices to serve as write destinations, into which another piece of data is written at a time the predetermined time period later than the time of the read demand. The second identification unit 605 references, for example, the write destination table 700 memorized by the memory unit 602 and identifies a combination of memory devices that correspond to the hash value and that are included in the servers S. In addition, from a combination of memory devices serving as read destination candidates, the second identification unit 605 identifies, as memory devices to serve as read destinations, memory devices different from memory devices serving as write destination candidates. From this, the second identification unit 605 is able to identify the memory devices to serve as the read destinations of data.

In the same way as in the first read operation, the read unit 606 reads data from the memory devices different from the memory devices that correspond to the time of the read demand and that are identified by the second identification unit 605. From this, the read unit 606 is able to read data from the memory devices serving as read destinations. In addition, from memory devices different from the memory devices that correspond to a time the predetermined time period later than the time of the read demand and that are identified by the second identification unit 605, the read unit 606 may read data at a time after the predetermined time period.

In the same way as in the first read operation, the output unit 607 transmits data, read by the read unit 606, to the client device C serving as a transmission source of the read demand for data. From this, the corresponding client device C is able to receive, from the corresponding storage device 100, the data subjected to the read demand.

(Example of First Operation of Storage Device 100)

Next, an example of a first operation of the storage device 100 will be described. The example of the first operation is a combination of the above-mentioned first write operation and first read operation. In the example of the first operation, the storage devices 100 each include the write destination table 700 described later in FIG. 7. The write destination table 700 is realized by, for example, the storage area of the memory 302, the disk 305, or the like, illustrated in FIG. 3.

<Memory Content of Write Destination Table 700>

FIG. 7 illustrates an example of a memory content of the write destination table 700. As illustrated in FIG. 7, the write destination table 700 includes a 1st replica item, a 2nd replica item, and a 3rd replica item while associating the 1st replica item, the 2nd replica item, and the 3rd replica item with a range item and memorizes records such as records 701 to 703 by setting information in each of the items for each of the ranges of a hash value.

In the range item, a range of a hash value is memorized. In a case where a hash value obtained from data is included in the ranges of a hash value of the range item, identification information for a 1st server S to serve as one of the servers S to serve as write destinations of the relevant data is memorized in the 1st replica item. In a case where a hash value obtained from data is included in the ranges of a hash value of the range item, identification information for a 2nd server S to serve as one of the servers S to serve as write destinations of the relevant data is memorized in the 2nd replica item.

In a case where a hash value obtained from data is included in the ranges of a hash value of the range item, identification information for a 3rd server S to serve as one of the servers S to serve as write destinations of the relevant data is memorized in the 3rd replica item. The record 701 is information in which, for example, the range of a hash value, "0 to 99", and the servers S11, S21, and S31 are associated with each other.

In a case where a write demand for data is issued, the corresponding storage device 100 is able to identify, by referencing the write destination table 700, the servers S that serve as write destinations of the data and that correspond to a hash value obtained from the data subjected to the write demand. In addition, in a case where a read demand for data is issued, the storage device 100 is able to identify, by referencing the write destination table 700, the servers S that serve as read destinations of the data, into which the data is written, and that correspond to a hash value obtained from the data.

<Examples of First Write Operation and First Read Operation>

Next, examples of the first write operation and the first read operation, performed by the storage device 100 in an example of the first operation, will be described.

(Example of First Write Operation)

In the example of the first write operation, one of the client devices C generates data. The data includes, as attributes, a generation source of the data, a time when the data is generated, a content of the data, and so forth. Every time generating data, the corresponding client device C assigns, to the data, a name including a time when the data is generated. In addition, the corresponding client device C transmits, to the corresponding storage device 100, a write demand for data to which a name including the time when the data is generated is assigned.

The corresponding client device C assigns, to data generated at, for example, a time, 2014/8/12 08:57, a character string, "201408120857", of the time, 2014/8/12 08:57 as a name. In addition, to the data, the corresponding client device C may assign, as a name, a character string, "log 201408120857", of the time, 2014/8/12 08:57, obtained by adding a predetermined prefix, "log". In addition, the corresponding client device C transmits a write demand for data to the corresponding storage device 100.

The corresponding storage device 100 receives, from the corresponding client device C, the write demand for data, which includes the name of data. Upon receiving the write demand, the corresponding storage device 100 calculates a hash value of the name included in the write demand. Next, the corresponding storage device 100 references the write destination table 700 and identifies, as the servers S to serve as write destinations of data, the servers S corresponding to the hash value. In addition, the corresponding storage device 100 writes data to the servers S serving as write destinations.

The corresponding storage device 100 receives, from the corresponding client device C, the write demand for data, to which, for example, the name, "log 201408120857", is assigned. Next, upon receiving the write demand, the corresponding storage device 100 substitutes, into a predetermined hash function, the name, "log 201408120857", thereby calculating the hash value, "203", of the name, "log 201408120857".

Furthermore, the corresponding storage device 100 references the record 703 of the write destination table 700 and identifies, as the servers S to serve as write destinations, the server S21, the server S41, and the server S11, which correspond to the hash value, "203". In addition, the corresponding storage device 100 transmits a write request for data to the servers S serving as write destinations. Here, upon receiving the write request, the servers S serving as write destinations each write data into the disk 505.

(Example of First Read Operation)

In the example of the first read operation, one of the client devices C transmits, to the corresponding storage device 100, a read demand for data that was previously subjected to a write demand and into which a name including a time when the data previously subjected to the write demand was generated. The corresponding client device C generates a read demand for data including, for example, a character string, "log 201407071003", that includes a past time, 2014/7/7 10:03, and that is assigned, as a name, to data generated at the time, 2014/7/7 10:03. In addition, the corresponding client device C transmits the read demand for data to the corresponding storage device 100.

The corresponding storage device 100 receives, from the corresponding client device C, the read demand for data, which includes the name of data. Upon receiving the read demand, the corresponding storage device 100 calculates a hash value of the name included in the read demand. In addition, the corresponding storage device 100 references the write destination table 700 and identifies, as the servers S serving as read destination candidates of data, the servers S corresponding to the hash value.

In addition, the corresponding storage device 100 acquires a current time. Next, the corresponding storage device 100 generates a character string of the current time, as the name of data likely to be written at the current time. Furthermore, the corresponding storage device 100 calculates a hash value of the character string of the current time. In addition, the corresponding storage device 100 references the write destination table 700 and identifies the servers S corresponding to the hash value, as the servers S including memory devices serving as write destination candidates, which are likely to become memory devices to serve as write destinations into which data is written at the current time. In the following description, the servers S including memory devices serving as write destination candidates, which are likely to become memory devices to serve as write destinations, into which data is written, are expressed as the "servers S serving as write destination candidates" in some cases.

Next, from among the servers S serving as read destination candidates of data, the corresponding storage device 100 identifies, as the server S to serve as a read destination of data, the server S different from the servers S serving as write destination candidates. In addition, the corresponding storage device 100 transmits a read request for data to the server S serving as a read destination of data. Next, the corresponding storage device 100 receives the data from the server S serving as a read destination. In addition, the corresponding storage device 100 transmits the received data to the client device C serving as a transmission source of the read demand.

At, for example, the time, 2014/8/12 08:57, the corresponding storage device 100 receives, from the corresponding client device C, a read demand for data to which the character string, "log 201407071003", of the past time is assigned as a name. Next, the corresponding storage device 100 substitutes, into a predetermined hash function, the name, "log 201407071003", and calculates the hash value, "106", of the name, "log 201407071003". In addition, the corresponding storage device 100 references the record 702 of the write destination table 700 and identifies, as the servers S serving as read destination candidates, the server S41, the server S11, and the server S51, which correspond to the hash value, "106".

In addition, the corresponding storage device 100 acquires the current time, 2014/8/12 08:57. Next, the corresponding storage device 100 generates the character string, "log 201408120857", of the current time, 2014/8/12 08:57. Furthermore, the corresponding storage device 100 substitutes, into a predetermined hash function, the character string, "log 201408120857", of the current time, thereby calculating the hash value, "203", of the character string, "log 201408120857", of the current time. In addition, the corresponding storage device 100 references the record 703 of the write destination table 700 and identifies, as the servers S serving as write destination candidates, the server S21, the server S41, and the server S11, which correspond to the hash value, "203".

Next, from among the servers S serving as read destination candidates, the corresponding storage device 100 identifies, as the server S to serve as a read destination, the server S51 different from the servers S serving as write destination candidates. Here, among the servers S serving as read destination candidates, there are the servers S different from the servers S serving as write destination candidates in some cases. In this case, from among, for example, the servers S serving as read destination candidates, the corresponding storage device 100 identifies, as the servers S to serve as read destinations, a memory device of the 1st replica item, a memory device of the 2nd replica item, and a memory device of the 3rd replica item in the write destination table 700 in this order, on a priority basis. In addition, the corresponding storage device 100 may identify, as the server S serving as a read destination, the server S in which a number included in identification information for the relevant server S is smaller, on a priority basis.

In addition, the corresponding storage device 100 transmits a read request for data to the server S serving as a read destination of data. Here, upon receiving the read request, the server S serving as a read destination reads data from the disk 505. In addition, the server S serving as a read destination transmits the read data to the corresponding storage device 100. The corresponding storage device 100 receives the data from the server S serving as a read destination. In addition, the corresponding storage device 100 transmits the received data to the client device C serving as a transmission source of the read demand.

From this, the corresponding storage device 100 is able to set, as the server S to serve as a read destination of a piece of data, the server S different from the servers S serving as write destination candidates and including memory devices that serve as write destination candidates and that are likely to become memory devices to serve as write destinations, which serve as write destinations of another piece of data. As a result, each of the storage devices 100 is able to suppress performance degradation of writing of data into a memory device included in the corresponding server S and is able to suppress an increase in a time taken to write data into the memory device.

(Example of Second Operation of Storage Device 100)

Next, an example of a second operation of the storage device 100 will be described. The example of the second operation is a combination of the above-mentioned second write operation and second read operation. In the example of the second operation, the storage devices 100 each include the correspondence table 800 described later in FIG. 8 in addition to the write destination table 700 illustrated in FIG. 7. The correspondence table 800 is realized by, for example, the storage area of the memory 302 or the disk 305, illustrated in FIG. 3.

<Memory Content of Correspondence Table 800>

Figure 8:
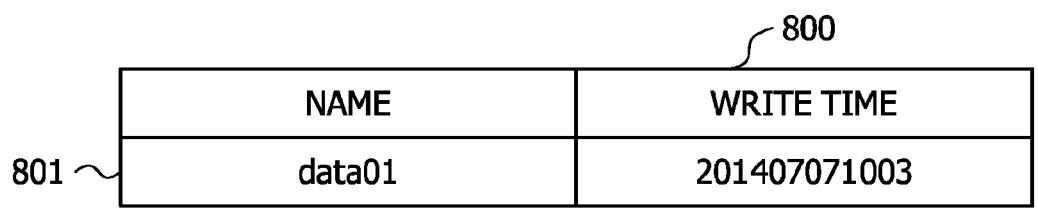
FIG. 8 illustrates an example of a memory content of a correspondence table 800.

FIG. 8 illustrates an example of a memory content of the correspondence table 800. As illustrated in FIG. 8, the correspondence table 800 includes a write time item while associating the write time item with a name item and memorizes a record such as a record 801 by setting information in each of the items for each of pieces of data. In the name item, the name of data is memorized. In the write time item, a character string including a time when data to which a name in the name item is assigned is written is memorized.

The record 801 is, for example, information in which a name, "data01", of data and a character string, "201407071003", including the time of a write demand for the relevant data are associated with each other. In a case where a read demand for data is issued, the corresponding storage device 100 is able to identify, by referencing the correspondence table 800, the time of a write demand for data at the time of previously writing the data.

<Examples of Second Write Operation and Second Read Operation>

Next, examples of the second write operation and the second read operation, performed by the storage device 100 in an example of the second operation, will be described.

(Example of Second Write Operation)

In the example of the second write operation, one of the client devices C generates data. Every time generating data, the corresponding client device C assigns an arbitrary name to the data. The corresponding client device C transmits, to the corresponding storage device 100, a write demand for data to which the arbitrary name is assigned. The corresponding client device C transmits, to the corresponding storage device 100, a write demand for data to which, for example, a character string, "data11", is assigned as a name.

The corresponding storage device 100 receives, from the corresponding client device C, the write demand for data to which the arbitrary name is assigned. Upon receiving the write demand, the corresponding storage device 100 acquires a current time. Next, the corresponding storage device 100 adds, to the correspondence table 800, a record in which the name assigned to the data and the current time are associated with each other. In addition, the corresponding storage device 100 generates, as a name of the data, a character string of the current time. Next, the corresponding storage device 100 calculates a hash value of the name. Furthermore, the corresponding storage device 100 references the write destination table 700 and identifies, as the servers S to serve as write destinations of the data, the servers S corresponding to the hash value. In addition, the corresponding storage device 100 transmits a write request for data to the servers S serving as write destinations.

The corresponding storage device 100 receives, from the corresponding client device C, the write demand for data to which, for example, the name, "data11", is assigned. Upon receiving the write demand, the corresponding storage device 100 acquires the current time, 2014/8/12 08:57. Next, the corresponding storage device 100 adds, to the correspondence table 800, a record in which the name, "data11", and the current time, 2014/8/12 08:57, are associated with each other. In addition, the corresponding storage device 100 generates, as a name of data, the character string, "log 201408120857", of the current time, 2014/8/12 08:57. Next, the corresponding storage device 100 substitutes, into a predetermined hash function, the name, "log 201408120857", and calculates the hash value, "203" of the name, "log 201408120857".

Furthermore, the corresponding storage device 100 identifies, as the servers S to serve as write destinations, the server S21, the server S41, and the server S11, which correspond to the hash value, "203". In addition, the corresponding storage device 100 transmits a write request for data to the servers S serving as write destinations. Here, upon receiving the write request, the servers S serving as write destinations each write data into the disk 505.

(Example of Second Read Operation)

In the example of the second read operation, one of the client devices C transmits, to the corresponding storage device 100, a read demand for data previously subjected to a write demand. The corresponding client device C generates a read demand for data, which includes, for example, the name, "data01", assigned to the data previously subjected to a write demand. In addition, the corresponding client device C transmits the read demand for data to the corresponding storage device 100.

The corresponding storage device 100 receives, from the corresponding client device C, a read demand for data to which an arbitrary name is assigned. Upon receiving the read demand, the corresponding storage device 100 references the correspondence table 800, thereby acquiring a time corresponding to the arbitrary name. Next, the corresponding storage device 100 generates, as a name of data, a character string of the time corresponding to the arbitrary name. Furthermore, the corresponding storage device 100 calculates a hash value of the generated name. In addition, the corresponding storage device 100 references the write destination table 700, thereby identifying, as the servers S serving as read destination candidates of data, the servers S corresponding to the hash value.

In addition, the corresponding storage device 100 acquires a current time. Next, the corresponding storage device 100 generates a character string of the current time, as the name of data likely to be written at the current time. Furthermore, the corresponding storage device 100 calculates a hash value of the character string of the current time. In addition, the corresponding storage device 100 references the write destination table 700 and identifies the servers S corresponding to the hash value, as the servers S that serve as write destination candidates and that include memory devices serving as write destination candidates, which are likely to become memory devices to serve as write destinations into which data is written at the current time.

Next, from among the servers S serving as read destination candidates of data, the corresponding storage device 100 identifies, as the server S to serve as a read destination of data, the server S different from the servers S serving as write destination candidates. In addition, the corresponding storage device 100 transmits a read request for data to the server S serving as a read destination of data. Next, the corresponding storage device 100 receives data from the server S serving as a read destination. In addition, the corresponding storage device 100 transmits the received data to the client device C serving as a transmission source of the read demand.

At, for example, the time, 2014/8/12 08:57, the corresponding storage device 100 receives, from the corresponding client device C, a read demand for data to which the arbitrary character string, "data01", is assigned as a name. Next, the corresponding storage device 100 references the record 801 of the correspondence table 800 and acquires the time, 2014/7/7 10:03, corresponding to the arbitrary character string, "data01". In addition, the corresponding storage device 100 generates, as the name of data, the character string, "log 201407071003", of the time.

Next, the corresponding storage device 100 substitutes, into a predetermined hash function, the name, "log 201407071003", and calculates the hash value, "106", of the name, "log 201407071003". In addition, the corresponding storage device 100 references the record 702 of the write destination table 700 and identifies, as the servers S serving as read destination candidates, the server S41, the server S11, and the server S51, which correspond to the hash value, "106".

In addition, the corresponding storage device 100 acquires the current time, 2014/8/12 08:57. Next, the corresponding storage device 100 generates the character string, "log 201408120857", of the current time, 2014/8/12 08:57. Furthermore, the corresponding storage device 100 substitutes, into a predetermined hash function, the character string, "log 201408120857", of the current time, thereby calculating the hash value, "203", of the character string, "log 201408120857", of the current time. In addition, the corresponding storage device 100 references the record 703 of the write destination table 700 and identifies, as the servers S serving as write destination candidates, the server S21, the server S41, and the server S11, which correspond to the hash value, "203".

Next, from among the servers S serving as read destination candidates of data, the corresponding storage device 100 identifies, as the server S to serve as a read destination, the server S different from the servers S serving as write destination candidates. In addition, the corresponding storage device 100 transmits a read request for data to the server S serving as a read destination of data. Here, upon receiving the read request, the server S serving as a read destination reads data from the disk 505. In addition, the server S serving as a read destination transmits the read data to the corresponding storage device 100. The corresponding storage device 100 receives the data from the server S serving as a read destination. In addition, the corresponding storage device 100 transmits the received data to the client device C serving as a transmission source of the read demand.

From this, the corresponding storage device 100 is able to set, as the server S to serve as a read destination of a piece of data, the server S different from the servers S serving as write destination candidates and including memory devices that serve as write destination candidates and that are likely to become memory devices to serve as write destinations, which serve as write destinations of another piece of data. As a result, each of the storage devices 100 is able to suppress performance degradation of writing of data into a memory device included in the corresponding server S and is able to suppress an increase in a time taken to write data into the memory device.

(Example of Read Processing Procedure)

Next, using FIG. 9, an example of a read processing procedure will be described.

Figure 9:
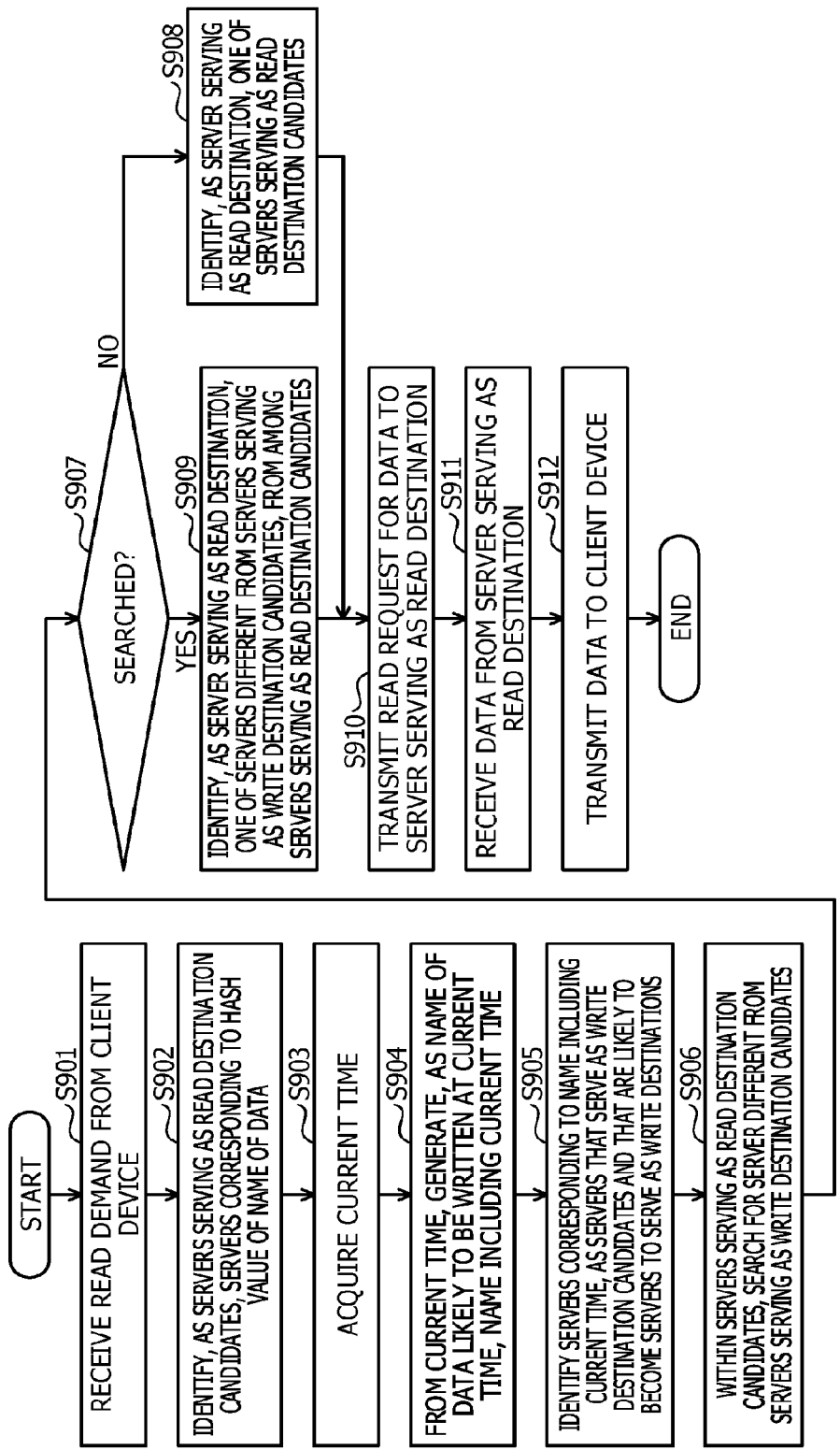
FIG. 9 is a flowchart illustrating an example of a read processing procedure.

FIG. 9 is a flowchart illustrating an example of the read processing procedure. In FIG. 9, one of the storage devices 100 receives a read demand from one of the client devices C (step S901). Next, the corresponding storage device 100 identifies, as the servers S serving as read destination candidates, the servers S corresponding to a hash value of a name of data (step S902). In addition, the corresponding storage device 100 acquires a current time (step S903).

Next, from the current time, the corresponding storage device 100 generates, as the name of data likely to be written at the current time, a name including the current time (step S904). In addition, the corresponding storage device 100 identifies the servers S corresponding to the name including the current time, as the servers S that serve as write destination candidates and that are likely to become servers to serve as write destinations (step S905).

Next, within the servers S serving as read destination candidates, the corresponding storage device 100 searches for the server S different from the servers S serving as write destination candidates (step S906). In addition, the corresponding storage device 100 determines whether or not being searched (step S907). Here, in a case of not being searched (step S907: No), the corresponding storage device 100 identifies, as the server S serving as a read destination, one of the servers S serving as read destination candidates (step S908) and make a transition to a processing operation in step S910.

On the one hand, in a case of being searched (step S907: Yes), the corresponding storage device 100 identifies, as the server S serving as a read destination, one of the servers S different from the servers S serving as write destination candidates, from among the servers S serving as read destination candidates (step S909). Next, the corresponding storage device 100 transmits a read request for data to the server S serving as a read destination (step S910). In addition, the corresponding storage device 100 receives data from the server S serving as a read destination (step S911).

Next, the corresponding storage device 100 transmits the data to the corresponding client device C (step S912). In addition, the corresponding storage device 100 terminates the read processing. From this, the corresponding storage device 100 is able to define, as the server S serving as a read destination of a piece of data, the server S different from the servers S serving as write destination candidates of another piece of data.

(Another Example of Read Processing Procedure)

Next, using FIG. 10, another example of the read processing procedure will be described.

FIG. 10 is a flowchart illustrating another example of the read processing procedure. In FIG. 10, one of the storage devices 100 receives a read demand from one of the client devices C (step S1001). Next, the corresponding storage device 100 identifies, as the servers S serving as read destination candidates, the servers S corresponding to a hash value of a name of data (step S1002). In addition, the corresponding storage device 100 acquires a current time (step S1003).

Next, from the current time, the corresponding storage device 100 generates, as the name of data likely to be written at the current time, a name including the current time (step S1004). In addition, the corresponding storage device 100 identifies the servers S corresponding to the name including the current time, as the servers S that serve as write destination candidates and that are likely to become servers to serve as write destinations (step S1005).

Next, within the servers S serving as read destination candidates, the corresponding storage device 100 searches for the server S different from the servers S serving as write destination candidates (step S1006). In addition, the corresponding storage device 100 determines whether or not being searched (step S1007). Here, in a case of not being searched (step S1007: No), the corresponding storage device 100 waits for a predetermined time period (step S1008) and make a transition to a processing operation in step S1004.

On the one hand, in a case of being searched (step S1007: Yes), the corresponding storage device 100 identifies, as the server S serving as a read destination, one of the servers S different from the servers S serving as write destination candidates, from among the servers S serving as read destination candidates (step S1009). Next, the corresponding storage device 100 transmits a read request for data to the server S serving as a read destination (step S1010). In addition, the corresponding storage device 100 receives data from the server S serving as a read destination (step S1011).

Next, the corresponding storage device 100 transmits the data to the corresponding client device C (step S1012). In addition, the corresponding storage device 100 terminates the read processing. From this, the corresponding storage device 100 is able to define, as the server S serving as a read destination of a piece of data, the server S different from the servers S that serve as write destination candidates and that are likely to become the servers S to serve as write destinations of another piece of data.

As described above, according to each of the storage devices 100, upon receiving a write demand for data, it is possible to identify, from the memory device group, memory devices corresponding to the time of the write demand and to write data into the identified memory devices. From this, each of the storage devices 100 is able to write duplicate copies of the data into the memory devices and to inhibit the data from being lost owing to a failure of a memory device.

In addition, according to each of the storage devices 100, upon receiving a read demand for data, it is possible to read the data from a memory device that is different memory devices corresponding to the time of the read demand and that is included in memory devices into which the data is written. From this, each of the storage devices 100 is able to determine, as a memory device to serve as a read destination of a piece of data, a memory device different from memory devices likely to become write destinations of another piece of data and is able to inhibit reading of data and writing of data from competing with each other in a memory device. As a result, each of the storage devices 100 is able to suppress performance degradation of writing of data into a memory device and is able to suppress an increase in a time taken to write data.

In addition, as data, data to which a name including the time of a write demand is assigned is used in some cases. In this case, according to each of the storage devices 100, upon receiving the write demand, it is possible to identify, from the memory device group, as memory devices to serve as write destinations, memory devices corresponding to the time included in the name. From this, each of the storage devices 100 does not have to memorize a memory device into which the data is written.

In addition, in this case, according to each of the storage devices 100, upon receiving a read demand, it is possible to identify a memory device that is different from memory devices corresponding to the time of the read demand and that is included in memory devices corresponding to a time included in a name, and it is possible to read data from the identified different memory device. From this, even if not memorizing a memory device into which the data is written, each of the storage devices 100 is able to read the data.

In addition, as data, data to which an arbitrary name is assigned is used in some cases. In this case, according to each of the storage devices 100, upon receiving a write demand, it is possible to memorize the time of the write demand while associating the time of the write demand with the name assigned to the data. In addition, according to each of the storage devices 100, upon receiving a read demand, it is possible to identify a memory device different from memory devices corresponding to the time of the read demand, from among memory devices corresponding to the time of a write demand corresponding to a name, and it is possible to read data from the identified different memory device. From this, even if the name of data is an arbitrary name, each of the storage devices 100 is able to read the data.

In addition, there is a case where, among memory devices, there is no memory device different from memory devices corresponding to the time of a read demand. In this case, according to each of the storage devices 100, from a memory device that is different from memory devices corresponding to a time a predetermined time period later than the time of the read demand and that is included in memory device into which data is written, it is possible to read the data at the time after the predetermined time period. From this, each of the storage devices 100 is able to define, as a memory device to serve as a read destination of a piece of data, a memory device different from memory devices that serve as write destination candidates and that are likely to become memory devices to serve as write destinations of another piece of data at the time after the predetermined time period. As a result, each of the storage devices 100 is able to suppress performance degradation of writing of data into a memory device and is able to suppress an increase in a time taken to write data into the memory device.

In addition, in this case, according to each of the storage devices 100, it is possible to read data from one of memory devices into which data is written. From this, each of the storage devices 100 is able to avoid difficulty of reading data.

In addition, according to each of the storage devices 100, for individual combinations of memory devices included in the memory device group, it is possible to memorize respective ranges of a hash value, different from one another. In addition, according to each of the storage devices 100, in a case of receiving a write demand, it is possible to identify memory devices within a combination corresponding to a hash value obtained from the time of the write demand and to write data into the identified memory devices. From this, each of the storage devices 100 is able to average a possibility that, based on a hash value, individual memory devices included in the memory device group become memory devices to serve as write destinations. In addition, each of the storage devices 100 is able to write duplicate copies of data into memory devices and to inhibit the data from being lost owing to a failure of a memory device.

Note that a program prepared in advance is executed by a computer such as a personal computer or a workstation, thereby enabling the read memory device determination method described in the present embodiment to be realized. The present read memory device determination program is recorded into a computer-readable recording medium such as a hard disk, a flexible disk, a CD-ROM, an MO, or a DVD and is executed by being read from the recording medium by the computer. In addition, the present read memory device determination program may be distributed via a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage controller configured to be coupled to a plurality of storage devices, the storage controller comprising:
    a memory; and
    a processor coupled to the memory and configured to
        receive a first write request of data,
        determine a first time when the first write request is received,
        specify, based on the first time, a first storage device included in the plurality of storage devices,
        write the data into the first storage device,
        receive a read request for the data,
        determine a second time when the read request is received,
        specify a second storage device included in the plurality of storage devices, wherein, in anticipation of a second write request received at the second time, the processor is configured to specify the second storage device based on the second time,
        determine whether the first storage device is identical to the second storage device, and
        read the data from the first storage device when the first storage device is not identical to the second storage device, but not read the data from the first storage device when the first storage device is identical to the second storage device.

2. The storage controller according to claim 1, wherein
    the first write request includes first time information indicating the first time,
    the processor is configured to determine the first time based on the first time information,
    the read request includes second time information indicating the second time, and
    the processor is configured to determine the second time based on the second time information.

3. The storage controller according to claim 1, wherein the processor is configured to
    determine the first time by identifying a reception time of the first write request, and
    determine the second time by identifying the reception time of the read request.

4. The storage controller according to claim 1, wherein the processor is configured to
    when the first storage device is identical to the second storage device, not read the data from the first storage for a certain time after the second time, and
    read the data from the first storage after the certain time has elapsed from the second time.

5. The storage controller according to claim 1, wherein the processor is configured to
    specify, based on the first time, the first storage device and a third storage device from the plurality of storage devices, the third storage device being different from the first storage device,
    write the data into the first storage device and the third storage device, and
    in response to receiving the read request, read the data from the third storage device when the first storage device is identical to the second storage device.

6. The storage controller according to claim 1, wherein the processor is configured to
    memorize ranges of a hash value, different from one another, for respective combinations of the storage devices included in the plurality of the storage devices,
    identify storage devices within a combination corresponding to the hash value obtained from the first time,
    write the data into the identified storage devices, and
    identify a storage device that is included in the plurality of storage devices and that is different from storage devices memorized while being associated with a hash value obtained from the second time.

7. A method performed by a computer having a processor, the method comprising:
    receiving a first write request of data;
    determining a first time when the first write request is received;
    specifying, based on the first time, a first storage device included in a plurality of storage devices;
    writing the data into the first storage device;
    receiving a read request for the data by the computer;
    determining a second time when the read request is received;
    specifying a second storage device included in the plurality of storage devices, wherein, in anticipation of a second write request received at the second time, the processor is configured to specify the second storage device based on the second time;

determining whether the first storage device is identical to the second storage device; and reading the data from the first storage device when the first storage device is not identical to the second storage device, but not reading the data from the first storage device when the first storage device is identical to the second storage device.

8. The method according to claim 7, wherein
the first write request includes first time information indicating the first time,
the read request includes second time information indicating the second time,
the determining of the first time determines the first time based on the first time information, and
the determining of the second time determines the second time based on the second time information.

9. The method according to claim 7, wherein
the determining of the first time determines the first time by identifying a reception time of the first write request, and
the determining of the second time determines the second time by identifying the reception time of the read request.

10. The method according to claim 7, further comprising:
when the first storage device is identical to the second storage device, not reading the data from the first storage for a certain time after the second time; and
reading the data from the first storage after the certain time has elapsed from the second time.

11. The method according to claim 7, further comprising:
specifying, based on the first time, the first storage device and a third storage device from the plurality of storage devices, the third storage device being different from the first storage device;
writing the data into the first storage device and the third storage device; and
in response to receiving the read request, reading the data from the third storage device when the first storage device is identical to the second storage device.

12. The method according to claim 7, further comprising:
memorizing ranges of a hash value, different from one another, for respective combinations of the storage devices included in the plurality of the storage devices;
identifying storage devices within a combination corresponding to the hash value obtained from the first time;
writing the data into the identified storage devices; and
identifying a storage device that is included in the plurality of storage devices and that is different from storage devices memorized while being associated with a hash value obtained from the second time.

13. A storage system comprising:
a client device; and
a storage apparatus configured to be coupled to a plurality of storage devices, wherein
the client device is configured to
transmit a first write request of data and a read request for the data to the storage apparatus, and
the storage apparatus is configured to
receive the first write request for the data,
determine a first time when the first write request is received,
specify, based on the first time, a first storage device included in the plurality of storage devices,
write the data into the first storage device,
receive the read request for the data,
determine a second time when the read request is received,
specify a second storage device included in the plurality of storage devices, wherein, in anticipation of a second write request received at the second time, the storage apparatus is configured to specify the second storage device based on the second time,
determine whether the first storage device is identical to the second storage device, and
read the data from the first storage device when the first storage device is not identical to the second storage device, while not read the data from the first storage device when the first storage device is identical to the second storage device.

14. The storage system according to claim 13, wherein
the first write request includes first time information indicating the first time,
the storage apparatus is configured to determine the first time based on the first time information,
the read request includes second time information indicating the second time, and
the storage apparatus is configured to determine the second time based on the second time information.

15. The storage system according to claim 13, wherein the storage apparatus is configured to
determine the first time by identifying a reception time of the first write request, and
determine the second time by identifying the reception time of the read request.

16. The storage system according to claim 13, wherein the storage apparatus is configured to
when the first storage device is identical to the second storage device, not read the data from the first storage for a certain time after the second time, and
read the data from the first storage after the certain time has elapsed from the second time.

17. The storage system according to claim 13, wherein the storage apparatus is configured to
specify, based on the first time, the first storage device and a third storage device from the plurality of storage devices, the third storage device being different from the first storage device,
write the data into the first storage device and the third storage device, and
in response to receiving the read request, read the data from the third storage device when the first storage device is identical to the second storage device.

18. The storage system according to claim 13, wherein the storage apparatus is configured to
memorize ranges of a hash value, different from one another, for respective combinations of the storage devices included in the plurality of the storage devices,
identify storage devices within a combination corresponding to the hash value obtained from the first time,
write the data into the identified storage devices, and
identify a storage device that is included in the plurality of storage devices and that is different from storage devices memorized while being associated with a hash value obtained from the second time.

* * * * *